United States Patent [19]
King, Jr.

[11] 3,962,843
[45] June 15, 1976

[54] RESILIENT SLEEVE JOINT CONSTRUCTION

[76] Inventor: John O. King, Jr., 3990 N. Ivy Road, Atlanta, Ga. 30342

[22] Filed: July 12, 1973

[21] Appl. No.: 378,443

Related U.S. Application Data

[63] Continuation-in-part of Ser. No. 268,478, July 3, 1972, which is a continuation-in-part of Ser. No. 33,281, April 30, 1970, abandoned, which is a continuation-in-part of Ser. No. 711,368, March 7, 1968, abandoned.

[52] U.S. Cl. ............................. 52/758 F; 403/243; 403/372; 403/408; 403/282; 85/82; 151/41.7
[51] Int. Cl.² ............................................ F16B 9/02
[58] Field of Search .......... 403/408, 243, 282, 284, 403/368, 372, 118, 343; 151/41.7, 41.72; 85/81, 82, 83; 52/758 F

[56] References Cited
UNITED STATES PATENTS

| | | | |
|---|---|---|---|
| 1,320,623 | 11/1919 | Kennedy | 85/70 |
| 1,400,405 | 12/1921 | Ogden | 85/83 |
| 2,896,684 | 7/1959 | Zahodiakin | 151/41.7 X |
| 3,298,725 | 1/1967 | Boteler | 403/282 |

*Primary Examiner*—Werner H. Schroeder
*Assistant Examiner*—Wayne L. Shedd
*Attorney, Agent, or Firm*—B. J. Powell

[57] ABSTRACT

A sleeve member for positioning between the fastener and work pieces within aligned holes through the work pieces. The sleeve member has a tubular side wall with outwardly and inwardly directed bends formed therein in an alternating pattern which are partially flattened out during the assembly of the fastener in the work pieces so that the natural resiliency of the sleeve member compensates for discrepancies in the holes and fastener.

8 Claims, 13 Drawing Figures

U.S. Patent   June 15, 1976   3,962,843

RESILIENT SLEEVE JOINT CONSTRUCTION

CROSS-REFERENCE TO RELATED APPLICATIONS

This application is a continuation-in-part of my co-pending application Ser. No. 268,478, filed July 3, 1972 which is a continuation-in-part application of my application Ser. No. 33,281, filed Apr. 30, 1970, now abandoned, which application is a continuation-in-part of my application Ser. No. 711,368, filed Mar. 7, 1968, now abandoned.

BACKGROUND OF THE INVENTION

In certain industries, such as the aerospace industry, tolerances in fastener joints are critical because of the high loads carried by the joint and because the fatigue life of the joint is somewhat dependent on these tolerances. The production equipment actually available in these industries, however, makes these tolerances very difficult, if not impossible, to obtain. While production facilities for fasteners are able to obtain relatively good tolerance ranges, the same has not been true of the hole making operation. This is because the hole forming tool such s a drill or reamer may flex or bend as within the holes to make a discrepancy and because the workman may unintentionally vary the angle of the tool with respect to the desired centerline that the formed hole is to have. The most prevalent discrepancy produced by the above mentioned problems is that part of the hole is oval rather than circular as desired especially on that side of the work pieces from which the work is being performed. This irregularity is generally referred to in the trade as "bell mouth".

These discrepancies have generally caused fretting that reduces the fatigue life of the joint. Also, these discrepancies have made it difficult to seal the joint against introduction of a corrosive atmosphere into the joint while in use in the field.

SUMMARY OF THE INVENTION

These and other problems associated with the prior art are overcome by the invention disclosed herein by providing a sleeve member positionable between the holes and the fastener which compensates for the tolerance discrepancies and effectuating a joint which has the desired capabilities of a joint within the desired tolerance range. The member is able to compensate for a wide range of hole and fastener discrepancy ranges so as to insure good joint capability. Moreover, the sleeve member serves to seal the joint against introduction of the corrosive atmosphere to extend the life thereof. Because the sleeve member is resilient and able to absorb the fatigue loading, the fatigue life of the joint is increased.

The sleeve member of the invention has a tubular side wall with an outwardly turned head flange integral with one end thereof. The side wall has outwardly and inwardly directed bends alternately formed therein to define a plurality of circumferentially extending external and internal ridges and valleys along the length of the side wall. The outside diameter of the external ridges is greater than the hole diameter and the internal diameter of the internal ridges is less than the diameter of the fastener so that as the sleeve member is forced into the holes, the bends will be partially flattened and as the fastener is inserted, the bends will be further flattened. The natural resiliency of the sleeve allows the sleeve member to fill the space between the fastener and hole wall and to absorb the fatigue loading.

These and other features and advantages of the invention will become more clearly understood upon consideration of the following specification and accompanying drawings wherein like character of reference designate corresponding parts throughout the several views and in which:

Figure 1:
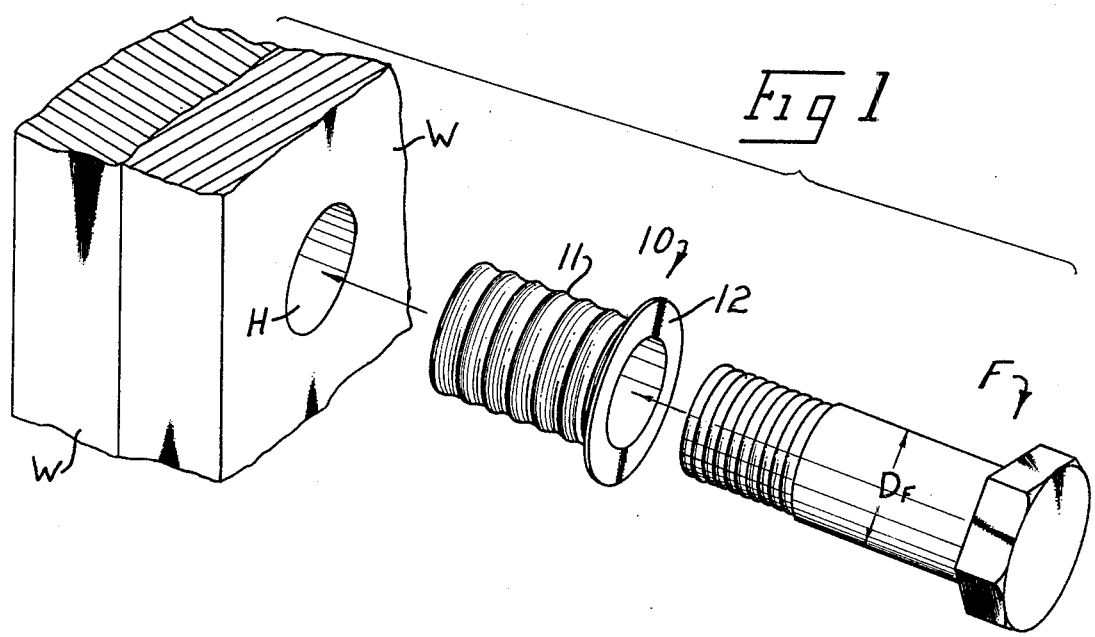
FIG. 1 is an exploded perspective view showing the use of the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the invention includes a sleeve member 10 to be positioned in the holes H of a joint between the fastener F and work pieces W. The sleeve member 10 has the capability of compensating for discrepancies in both the holes H and fastener F because of its resiliency.

As seen in FIGS. 1–4, the sleeve member 10 includes a tubular side wall 11 having a centerline CL and an annular head flange 12 at one end of and integral side wall 11. The head flange 12 may be for an exposed head fastener F as illustrated or a countersunk head fastener. The tubular side wall 11 has a substantially constant thickness t along its length usually in the range of 0.006 inch to 0.016 inch as will become more apparent.

The side wall 11 has formed therein a plurality of outwardly and inwardly extending bends 14 and 15 formed therein circumferentially extending around wall 11 at longitudinally spaced points therealong. Thus, in longitudinal cross-section, it will be seen that side wall 11 has a sinusoidal or serpentine shape along its length. This forms a series of external ridges 16 and valleys 18 therebetween. Likewise, this also forms a series of internal ridges 19 and valleys 20 therebetween. Because of the constant thickness of side wall 11, it will be seen that the external ridges 16 are longitudinally aligned with the internal valleys 20, and the external valleys 18 are longitudinally aligned with the internal ridges 19. The bends 14 and 15 are illustrated as lying in planes normal to the centerline CL of sleeve member 10, however, other orientations may be used such as helical. The bends 14 and 15 may be formed using conventional roll forming or coining techniques. It will also be noted that the material of the sleeve member is such that it has natural flexing resiliency yet is sufficiently strong to carry loads. While any of a number of different materials may be used, stainless steel has been used satisfactorily.

In order that the sleeve member 10 may be used, the dimensional relationship of both the sleeve member 10, work pieces W and fastener F must be considered. Because the working diameter $D_F$ of fastener F usually is available in standard sizes, the formation of both the sleeve member 10 and holes H are based on diameter $D_F$. The holes H are formed with a nominal diameter $D_H$ which is the fastener diameter $D_F$ plus the thickness $t$ of side wall 11. Because the tools used to form holes H never form a hole smaller than the diameter of the tool, but frequently form holes having portions greater than its diameter, there is no problem of undersize holes. The sleeve member 10 has, prior to the formation of bends 14 and 15, a nominal outside diameter $d_o$ nominally equal to the hole diameter $D_H$ and a nominal inside diameter $d_i$ nominally equal to the working diameter $D_F$ of fastener F. This is assuming of course, that a line-to-line fit is desired. If an interference fit is desired, the hole diameter $D_H$, and possibly the sleeve member diameters $d_o$ and $d_i$, would be appropriately changed as will become more apparent.

Figure 3:
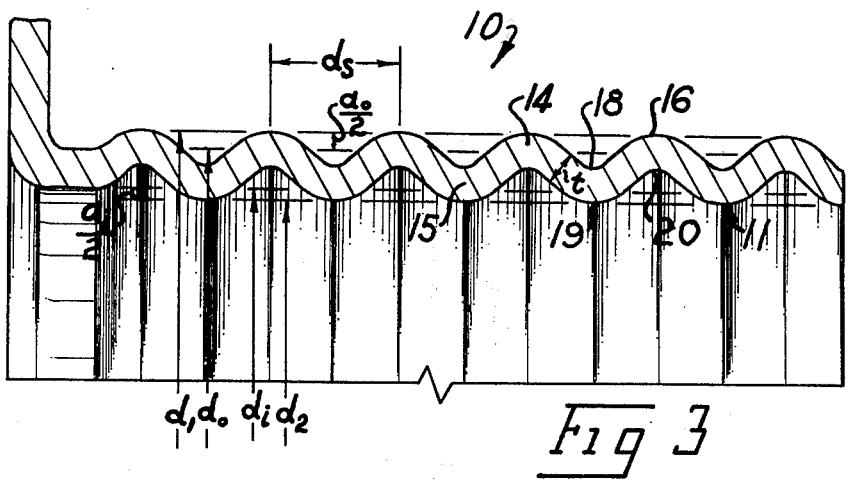
FIG. 3 is an enlarged portion of FIG. 2.

The bends 14 and 15 have a maximum outside diameter $d_1$ a prescribed amount $a_o$ larger than the nominal hole diameter $D_H$ and a minimum inside diameter $d_2$ a prescribed amount $a_i$ smaller than the nominal working diameter $D_F$ of fastener F. This is best illustrated in FIG. 3 where one half of the actual amounts $a_o$ and $a_i$ are illustrated. From the above, it will be seen that diameter $d_1$ is greater than the diameter $d_o$ by the amount $a_o$ and diameter $d_2$ is less than diameter $d_i$ by the amount $a_i$. While different values may be used for the amounts $a_o$ and $a_i$, one suggested value for each amount $a_o$ and $a_i$ is approximately 0.004 inch.

Figure 4:
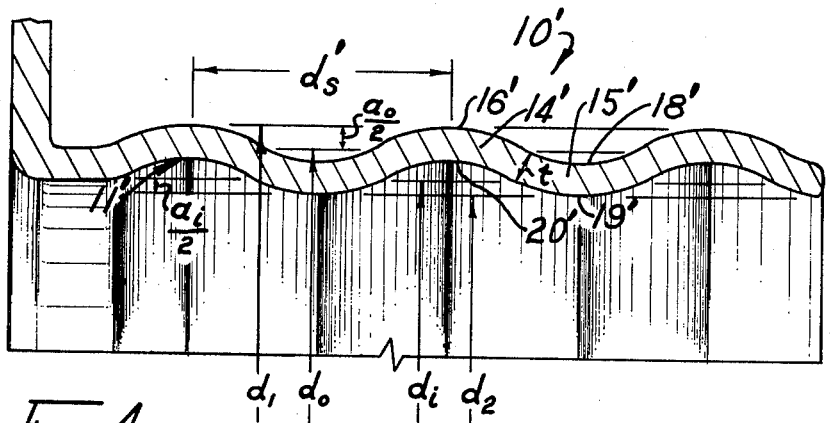
FIG. 4 is a view similar to FIG. 3 showing a different arrangement.

The longitudinal spacing $d_s$ between adjacent external bends 14 or between adjacent bends 15 is the same. It will be understood that the spacing $d_s$ may be varied. One suggested spacing $d_s$ shown in FIG. 3 is approximately 1/32 inch while another suggested spacing $d_s'$ shown in FIG. 4 is approximately 1/16 inch. The portions of the sleeve member of FIG. 4 corresponding to those of FIG. 3 are indicated by primes of the reference numbers applied to FIG. 3. It will be understood that sleeve member 10' will be used similarly to sleeve member 10.

Figure 2:
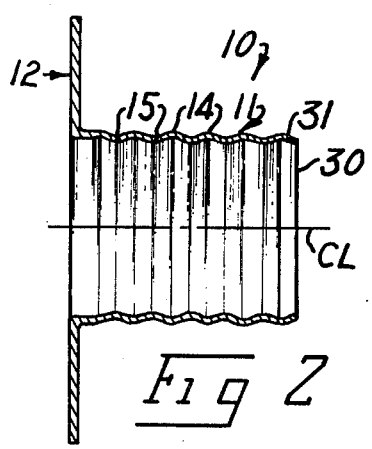
FIG. 2 is a longitudinal cross-sectional view of a sleeve member made in accordance with the invention.

In order to insure that the leading end 30 of the sleeve member 10 does not damage the material around holes H, the wall 11 is terminated so that an inwardly directed flange 31 is formed on the end 30 as seen in FIGS. 2 and 3. This insures that a smooth curved surface will always engage the work pieces W about holes H.

OPERATION OF FIRST EMBODIMENT

Figure 5:
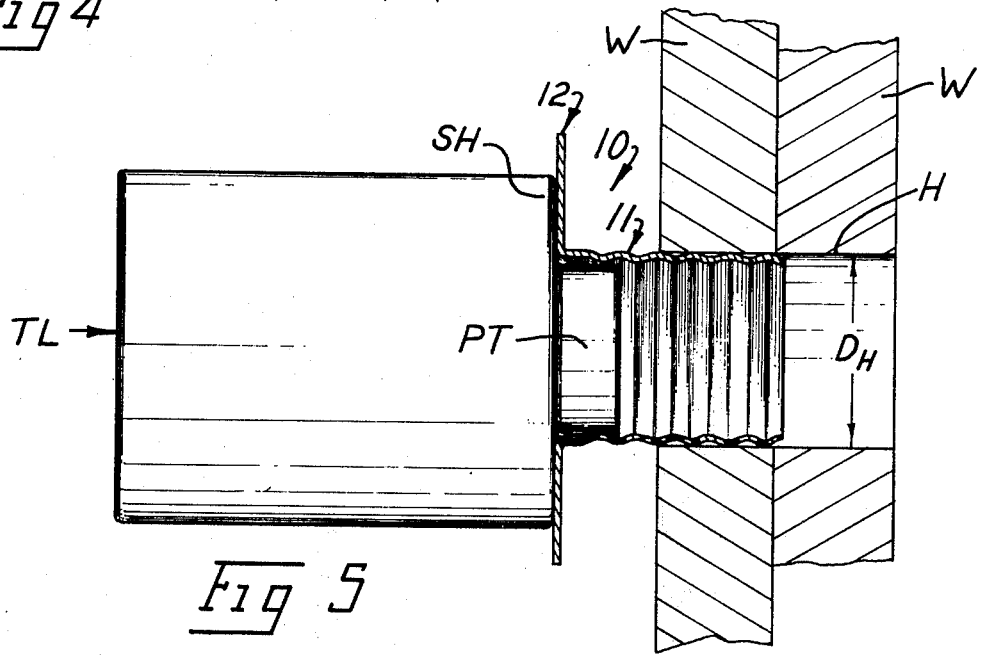
FIG. 5 is a cross-sectional view showing the sleeve member being installed in the holes through the work pieces.

The operation of the first embodiment of the sleeve member 10 can best be seen in FIGS. 5 – 8. The sleeve member 10 is shown being forced into the holes H in FIGS. 5 and 6. A tool TL may be provided for assisting in forcing the sleeve member 10 into the holes H as seen in FIG. 5. The tool TL has a pilot PT which fits within the side wall 11 with diameter smaller than the minimum inside diameter $d_2$ of sleeve member 10 and a shoulder SH that engages the head flange 12.

Figure 6:
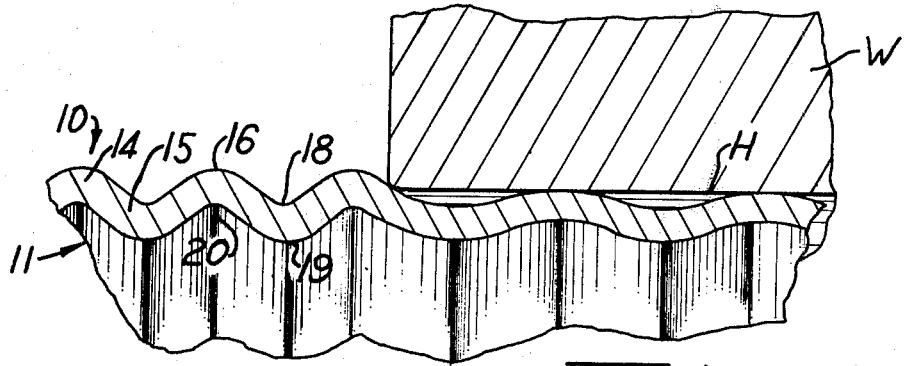
FIG. 6 is an enlarged portion of FIG. 5.

As the sleeve member 10 is forced into holes H as best seen in FIG. 6, it will be seen that the bends 14 and 15 are partially flattened out against the natural resiliency of the material of sleeve member 10. This is because the maximum outside diameter $d_1$ of sleeve member 10 is greater than the diameter $D_H$ of holes H. As the external ridges 16 are forced into holes H, the wiping action of the ridges on the wall of the holes produces a tight seal between the sleeve member 10 and work pieces W within holes H. Usually, the minimum inside diameter $d_2$ is also slightly reduced by this operation, however, the amount of reduction is not sufficient to affect the insertion of fastener F. It will, of course, be understood that the diameter of the pilot PT on tool TL is just sufficiently small to be slidably removed from the sleeve member 10 after it is fully seated in holes H.

Where the material of the sleeve member 10 is of high strength such as stainless steel, it will be seen that considerable force is required to insert the sleeve member 10 into the holes and a considerable outwardly directed force is generated in the work pieces W immediately adjacent the holes H. This serves to smooth out any burrs or other surface impertions in the holes while at the same time slightly coldworking the holes H to improve the fatigue life of the joint. The action also acts to deburr the entrance to hole H as seen in FIG. 6.

Figure 7:
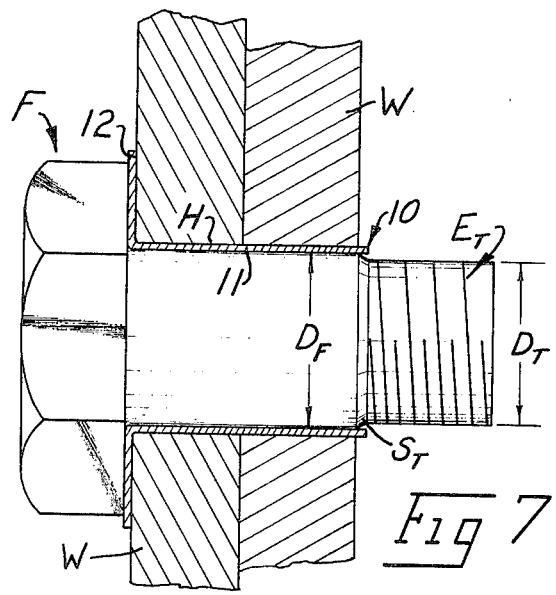
FIG. 7 is a cross-sectional view showing the fastener installed.
Figure 8:
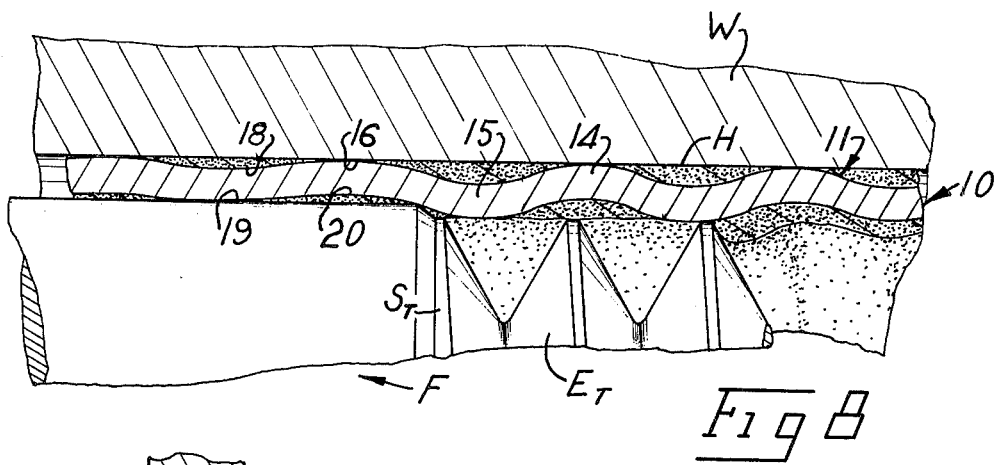
FIG. 8 is an enlarged portion of FIG. 7 showing the fastener being installed.

The fastener F is shown being inserted into the sleeve member 10 after the sleeve member has been installed in the holes H through the work pieces in FIGS. 7 and 8. The fastener F is shown fully installed in FIG. 7 with the enlarged view in FIG. 8 showing the fastener F being installed. As seen in FIG. 8, it will be noted that the diameter $D_T$ of the engagement portion $E_T$ of the fastener F is a prescribed amount less than the working diameter $D_F$ of the bearing area on the shank of the fastener, usually in the order of 0.003 inch less. A transition surface $S_T$ is provided between the bearing area on the shank of the fastener and the engagement portion $E_T$ of the fastener, here shown as threads. It will thus be seen that the fastener F is installed by first sliding the engagement portion $E_T$ into the sleeve member which serves to orient the fastener and support it while it is being driven into the sleeve 10. As the fastener F is driven into the sleeve member 10, the transition surface $S_T$ serves to further flatten out the bends 14 and 15 in the sleeve member 10. Because of the allowable tolerance ranges of both the holes H and the fastener F, the bends 14 and 15 are usually not fully flatten out when the fastener F is installed leaving slight undulations in the side wall 11 between the fastener F and work pieces W as seen in the left hand side of FIG. 8. Thus, when a material with a good spring action such as stainless steel is used, the major damaging action of fatigue loading will be absorbed in the sleeve member 10 without damage to the joint in which it is used. It is further to be understood that other materials rather than those with significant spring action may be used for the sleeve member 10 where fatigue loading is not critical but sealing is desired. One such material is aluminum.

From the foregoing, it will be seen that as the bends 14 and 15 in the side wall 11 of sleeve member 10 are flattened out, any discrepancies in the diameter of the holes H or in the working diameter $D_F$ of the fastener F are automatically compensated for. This means that very good bearing contact is always maintained between the work pieces W and the fastener F to insure good joint life.

Because fasteners in the aerospace industry are usually driven after being coated with a sealant, it is anticipated that the sleeve member 10 will usually be coated with a sealant SL as seen in FIG. 8 before installation. Thus, it will be seen that sealant will fill any of the voids formed by the remaining undulations left in the side wall 11 after the joint is fabricated. Because the sealant is generally incompressible, the entrapped sealant will serve to further strengthen the joint.

It will also be noted that because the sleeve member 10 can be expanded, a fastener with a working diameter larger than that described above may be used to produce an interference fit. The bends 14 and 15 would then serve as anti-rotation devices to prevent the fastener from turning during installation.

Figure 9:
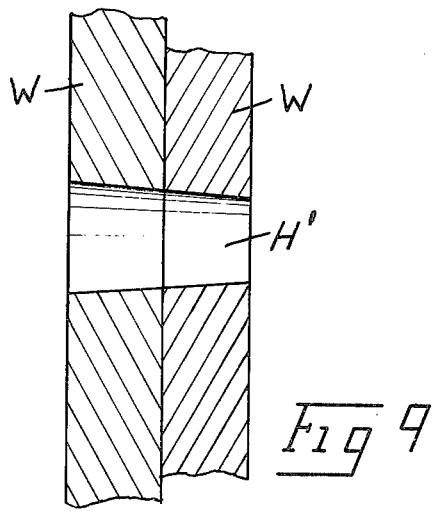
FIG. 9 is a cross-sectional view of work pieces illustrating hole discrepancies.
Figure 10:
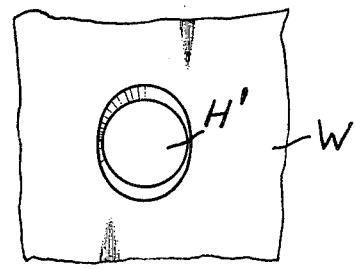
FIG. 10 is an end view of FIG. 9.

The prior art problem of hole discrepancies previously referred to as "bell-mouth" is illustrated in FIGS. 9 and 10. The holes H' illustrated are generally circular on the off side of the work pieces W but may be tapered outwardly slightly to form an oval shape toward the working side of the work pieces from which the hole making operation is performed. This produces a very slightly tapered hole which has been exaggerated in FIGS. 9 and 10 to render the discrepancy clearly visible, it being understood that in actuality, these irregularities are in the order of a few thousandths of an inch. From the above description, it will be seen that when the sleeve member 10 is inserted into such holes H', the bends 14 and 15 inherently compensate for the "bell-mouth" decrepancy.

SECOND EMBODIMENT

Figure 11:
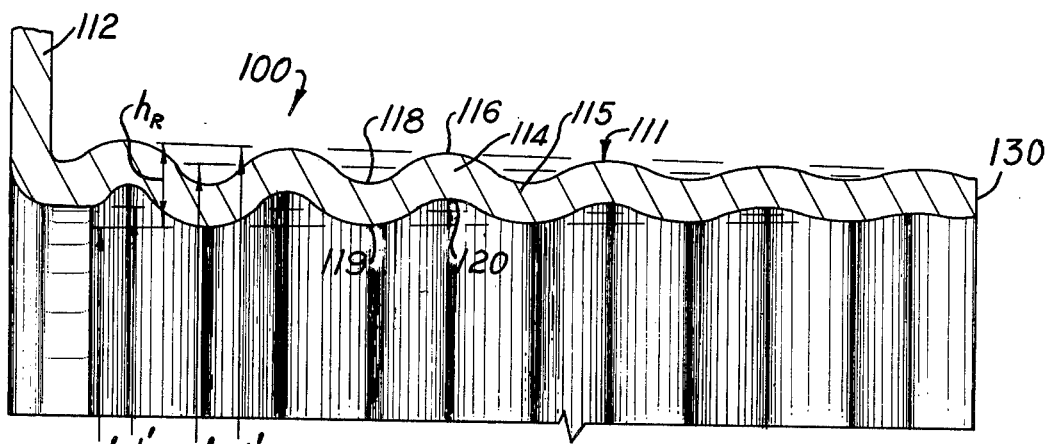
FIG. 11 is an enlarged cross-sectional view illustrating an alternate embodiment of the sleeve member.
Figure 12:
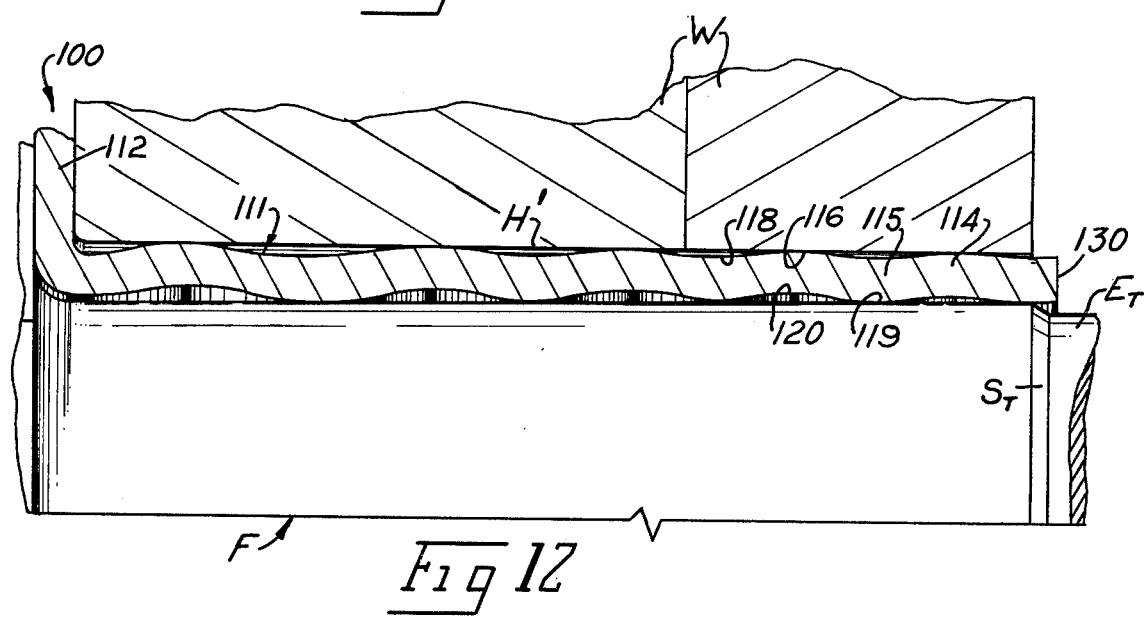
FIG. 12 is a view similar to FIG. 11 showing the sleeve member installed.

Referring to FIGS. 11 and 12, a second embodiment of the sleeve member which is designated 100 is illustrated. The sleeve member 100 is constructed quite similarly to the sleeve member 10, but is specifically designed for use in correcting the hole discrepancy commonly referred to as "bell-mouth" discussed above. The sleeve member 100 includes a side wall 111 and head flange 112 corresponding to the sleeve member 10 with a plurality of outwardly and inwardly directed bends 114 and 115 forming external ridges and valleys 116 and 118 and internal ridges and valleys 119 and 120. The distinction between the first embodiment and the second embodiment is that the sleeve member 100 has its major outside diameter $d_1'$ decreasing toward its nominal outside diameter $d_o'$ from a point adjacent the head flange 112 to the distal end 130 of the member 100. In like manner, the minimum inside diameter $d_2'$ increases toward the nominal inside diameter $d_i'$ of the member 100 from adjacent the head flange 112 to the distal end 130 of the sleeve member. Thus, it will be seen that the height $h_r$ across ridges 116 and 119 decreases along the length of side wall 111 from the head flange 112 toward the distal end 130. The diameter $d_1'$ is shown constantly decreasing and the diameter $d_2'$ is shown constantly increasing, however, it is to be understood that different arrangements may be used with the same result.

It will be seen that the sleeve member 100 is installed in a manner similar to the sleeve member 10 and serves a similar function. It will further be seen that the bends 114 and 115 accurately compensate for the difference in diameters of holes H' between the working side of the work pieces and the off side of the work pieces as best seen in FIG. 12 which shows sleeve member 100 installed in holes H'.

MODIFICATION

Figure 13:
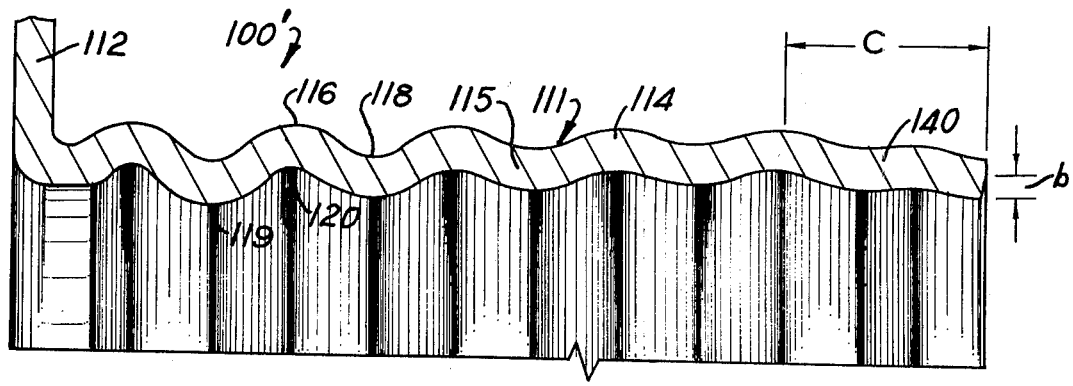
FIG. 13 is an enlarged cross-sectional view illustrating a modification of the sleeve member.

FIG. 13 illustrates a modification of the sleeve member 100, however, it is to be understood that such modification may be applied to the sleeve member 10. The modified sleeve member is indicated generally by the reference numeral 100' and those portions of the modification common to sleeve member 100 are referenced by the same numerals.

The distal end 130 of sleeve member 100' is tapered inwardly by a prescribed amount $b$, usually in the order of 0.002–0.004 inch. The tapered portion 140 of the side wall 111 extends down sleeve member 100' a prescribed distance $c$, usually ⅛ inch. The portion 140 serves to center the sleeve member 100' as it is being inserted and to align any small amounts of misalignment between the work pieces W. The tapered portion 140 further prevents scratching or otherwise damaging the holes H as the sleeve member 100' is being installed.

The sleeve member 100' is installed similarly to that described above. When the fastener F is installed, however, it will be seen that the tapered portion 140 is straightened.

While specific embodiments of the invention have been disclosed herein, it is to be understood that full use may be made of modifications, substitutions and equivalents without departing from the scope of the inventive concept.

I claim:
1. A joint construction comprising:
   a plurality of work pieces having aligned holes therethrough of a nominal first prescribed diameter;
   a fastener through said holes having a second nominal working diameter;
   a sleeve member between said fastener and said work pieces within said holes including a resilient tubular metal side wall having a predetermined thickness, said side wall having formed therein a plurality of outwardly directed bends and a plurality of inwardly directed bends, said outwardly and inwardly directed bends alternating to form external ridges and valleys and internal ridges and valleys, the resiliency of said side wall urging said external ridges toward a substantially constant maximum unrestrained outside diameter along the length of said side wall a prescribed amount larger than said first prescribed diameter of said holes and urging said internal ridges toward a substantially constant minimum unrestrained inside diameter a prescribed amount smaller than said second nominal working diameter of said fastener.

2. A joint construction comprising:
   a plurality of work pieces having aligned holes therethrough of a nominal first prescribed diameter;
   a fastener through said holes having a second nominal working diameter;
   a sleeve member between said fastener and said work pieces within said holes including a resilient tubular metal side wall having a predetermined thickness, said side wall having formed therein a plurality of outwardly directed bends and a plurality of inwardly directed bends, said outwardly and inwardly directed bends alternating to form external ridges and valleys and internal ridges and valleys, the resiliency of said side wall urging said external ridges toward a substantially constantly decreasing maximum unrestrained outside diameter from one end of said side wall to the other and urging said internal ridges toward a substantially constantly increasing minimum unrestrained inside diameter from said one end of said side wall to said other, the smallest maximum unrestrained outside diameter being a prescribed amount larger than said first prescribed diameter of said holes and the largest minimum unrestrained inside diameter being a prescribed amount smaller than said second working diameter of said fastener.

3. The joint construction of claim 1 wherein the material of said sleeve member is stainless steel.

4. The joint construction of claim 1 wherein said sleeve member includes an annular head flange at one end of said tubular side wall.

5. The joint construction of claim 1 wherein said predetermined thickness of said tubular side wall is .006-.016 inch.

6. The joint construction of claim 1 wherein said bends extend circumferentially about said side wall and lie in a plane generally normal to the centerline of said sleeve member.

7. The joint construction of claim 6 wherein said tubular side wall of said tubular member terminates at one end so that said bends define an inwardly tapering flange thereat.

8. The joint construction of claim 7 wherein said sleeve member includes an annular head flange integral with that end of said tubular side wall opposite said inwardly tapering flange, and wherein said tubular side wall is made of stainless steel having a predetermined thickness along the length thereof of .006-.016 inch.

* * * * *